June 15, 1948.  E. H. HURLEY  2,443,248

MOTION PICTURE FILM STRIP UNWINDING APPARATUS

Filed July 6, 1945  4 Sheets-Sheet 1

INVENTOR.
E. H. Hurley
BY
ATTORNEYS.

June 15, 1948. E. H. HURLEY 2,443,248
MOTION PICTURE FILM STRIP UNWINDING APPARATUS
Filed July 6, 1945 4 Sheets-Sheet 2
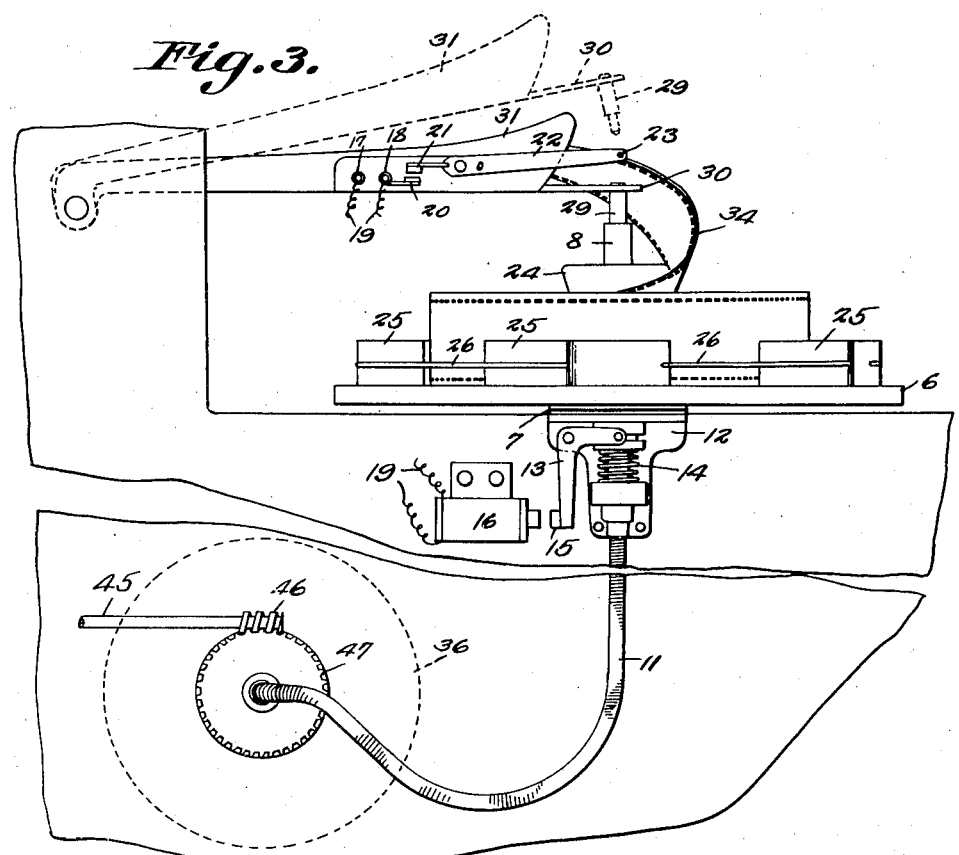
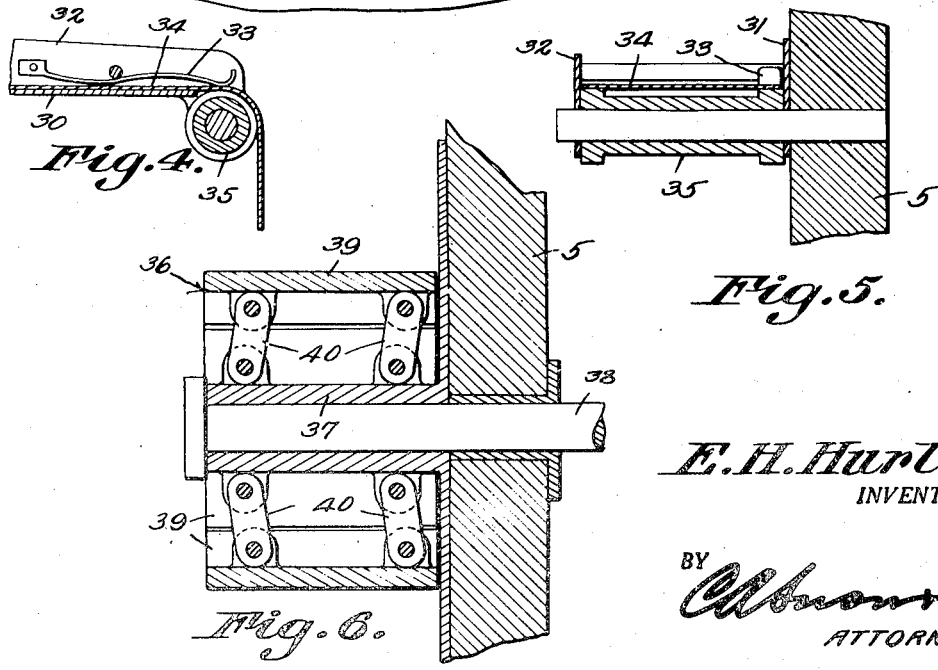
E. H. Hurley
INVENTOR.
BY
ATTORNEYS.

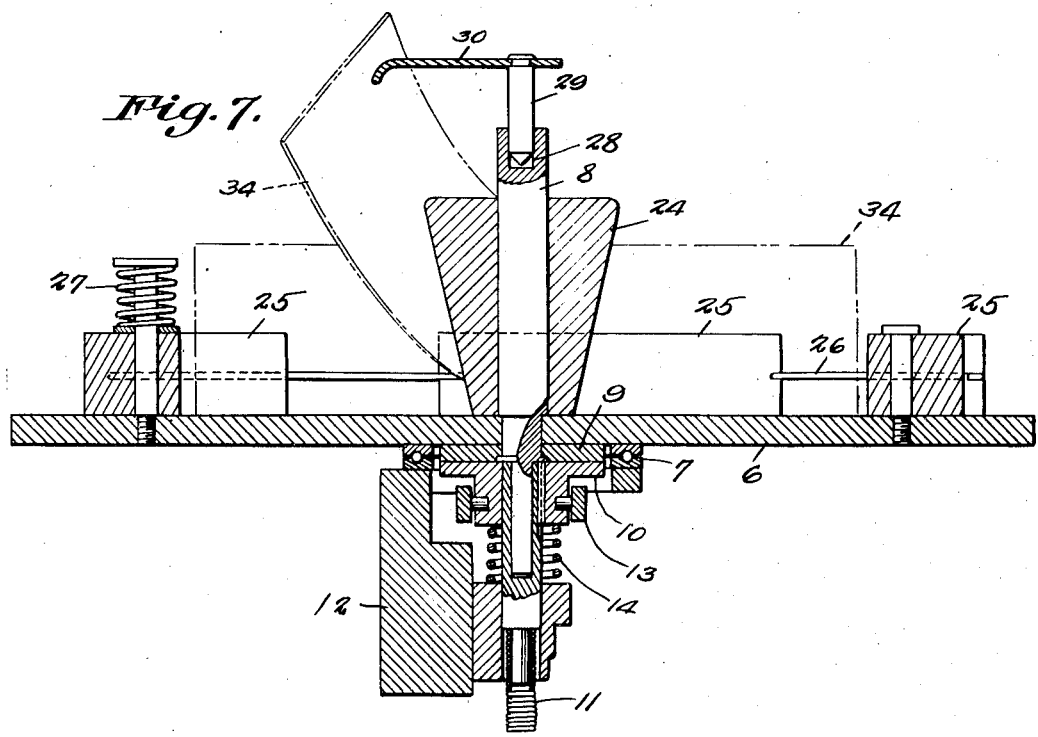
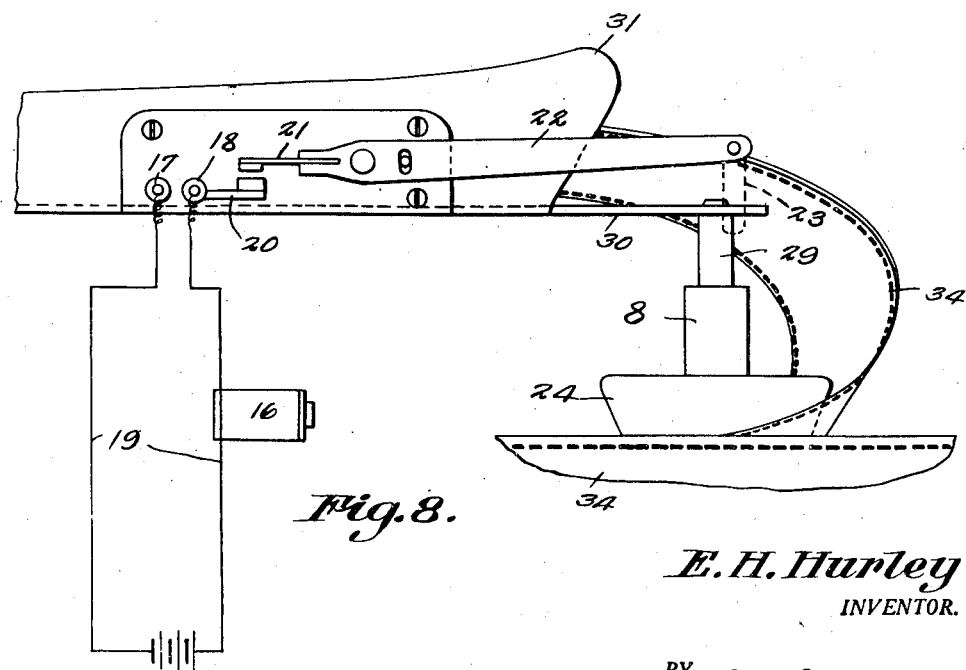

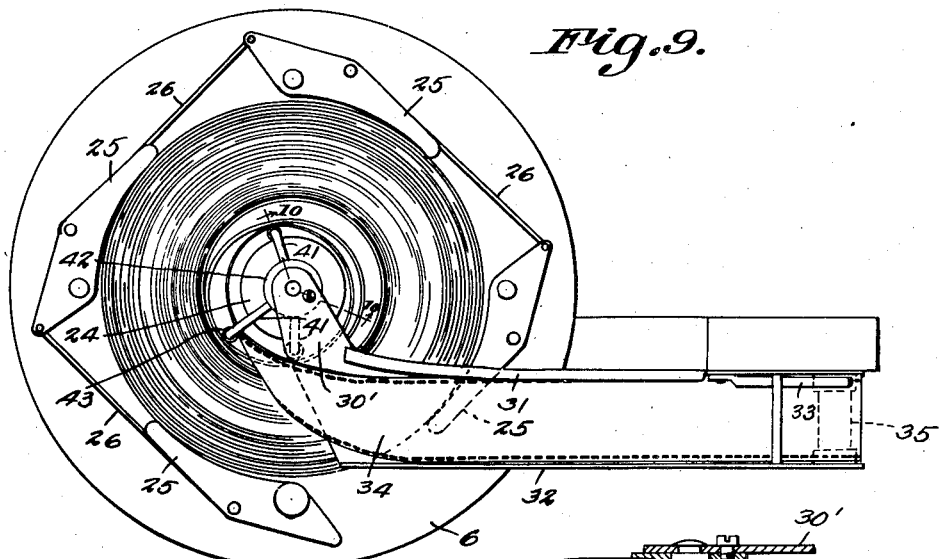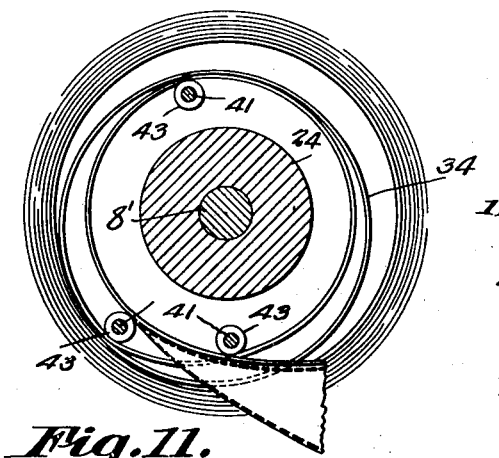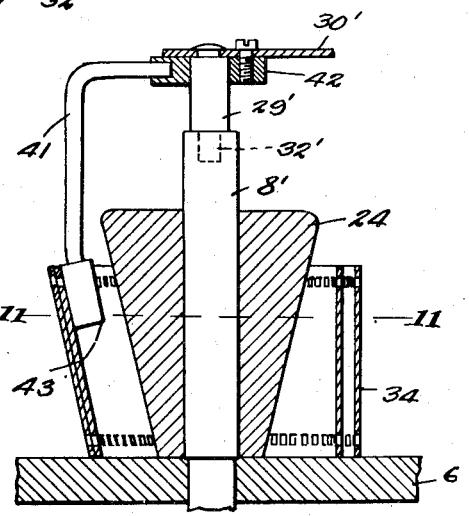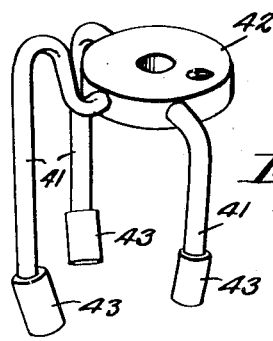

Patented June 15, 1948

2,443,248

UNITED STATES PATENT OFFICE 2,443,248

MOTION PICTURE FILM STRIP UNWINDING APPARATUS

Earl H. Hurley, Emporium, Pa., assignor of thirty percent to John J. Lynch, St. Marys, Pa.

Application July 6, 1945, Serial No. 603,535

3 Claims. (Cl. 88—18.7)

This invention relates to motion picture film strip unwinding apparatus, the primary object of the invention being to provide means whereby the film strip when being projected, may be unwound from its roll at the center or core of the roll, thereby eliminating the necessity of rewinding the film in order to properly re-exhibit the film.

An important object of the invention is to provide a film unwinding apparatus wherein film spools are eliminated, the film strip being wound on an especially designed collapsible hub from which the film strip may be readily removed in roll form, without damage to the film.

Another object of the invention is to provide a direct connecting means between the film roll supporting or turn-table and winding reel of the machine, whereby the reel and the turn-table are rotated, to the end that the diameters of the rolls of film at the varying points, remain the same at all times, thereby eliminating all reduction gears and clutch mechanism necessary when unwinding film strips wherein the diameters of the film rolls are constantly changing.

Still another object of the invention is to provide an automatic clutch mechanism adapted to release the turn-table on which the film strip revolves, in the event that the film strip unwinds at such a speed as to cause a surplus amount of film strip between the unwinding roll of film strip and the winding reel on which the strip is wound and which will effect the unwinding operation.

With the foregoing and other objects in view which will appear as the description proceeds, the invention consists of certain novel steps in the method and certain details of construction and combinations of parts hereinafter more fully described and pointed out in the claims, it being understood that changes may be made in the method disclosed and in the construction and arrangement of parts without departing from the spirit of the invention as claimed.

Referring to the drawings:

Figure 3 is a rear elevational view of the device, illustrating the automatic clutch operating mechanism.

Figure 4 is a longitudinal sectional view through the outer end of the film strip guide mechanism taken on line 4—4 of Fig. 2.

Figure 5 is a sectional view taken on line 5—5 of Figure 1.

Figure 6 is a sectional view taken on line 6—6 of Figure 1.

Figure 7 is a sectional view taken on line 7—7 of Figure 2.

Figure 8 is a view illustrating the automatic clutch control mechanism.

Figure 9 is a plan view of the device, wherein the turn-table operates independently of winding reel of the mechanism.

Figure 10 is a sectional view taken on line 10—10 of Figure 9.

Figure 11 is a sectional view taken on line 11—11 of Figure 10.

Figure 12 is a perspective view of the centering fingers used to hold the inner convolutions of the film roll against contracting to set up a binding action when the film strip is being unwound.

Figure 1:
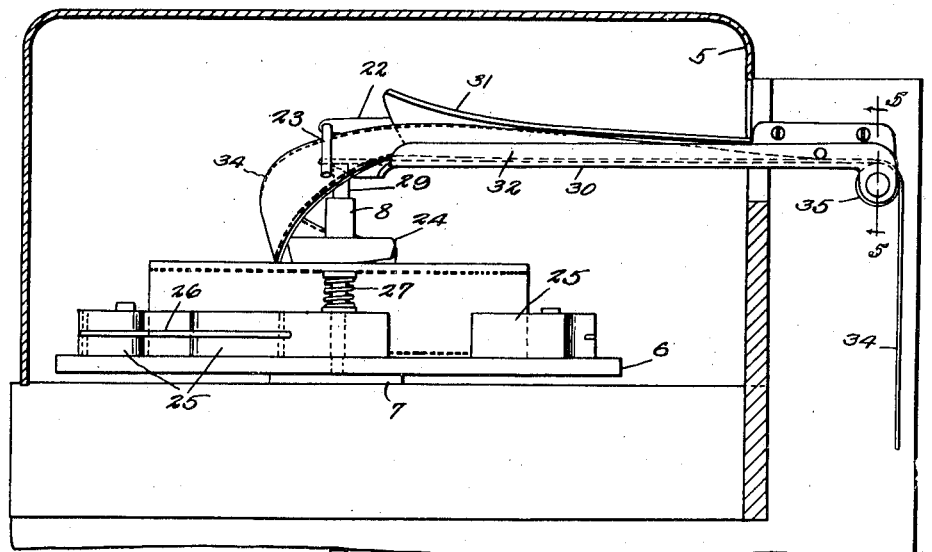
Figure 1 is an elevational view illustrating the turn-table and guiding means through which the film strip moves when passing from the roll of film strip mounted on the turn-table.
Figure 2:
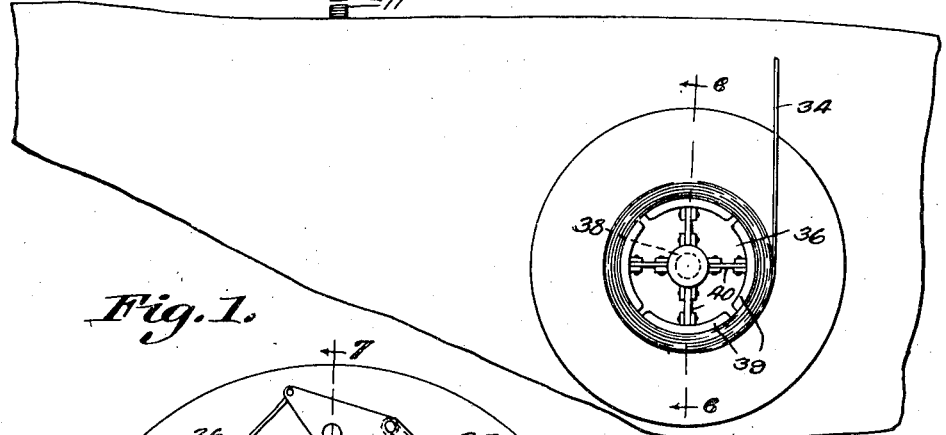
Figure 2 is a plan view thereof.
Figure 2:
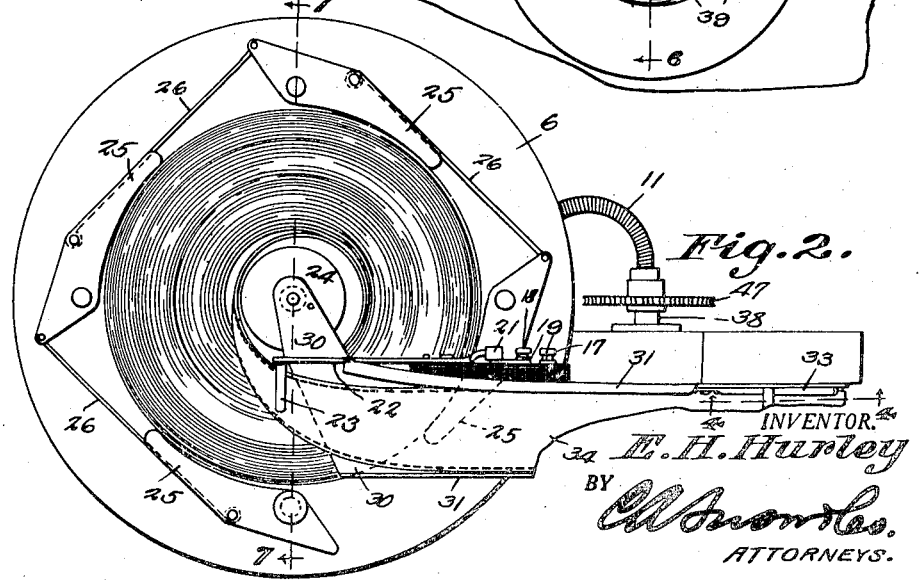

Referring to the drawing in detail, the reference character 5 indicates a housing in which the turn-table of the machine is mounted, and this housing may be a permanent part of a motion picture projecting machine, or may be in the form of an attachment for use with the usual motion picture machine.

The turn-table of the machine is indicated by the reference character 6, and is mounted on the bearings 7 disposed within the housing, directly under the turn-table 6.

Extending through the turn-table at a point centrally thereof, is a vertical shaft 8 to the lower end of which is connected the friction clutch member 9 that cooperates with the clutch member 10 for transmitting movement from the power shaft 11, to the vertical shaft 8. Directly under the turn-table is a supporting bracket 12 to which the bell crank lever 13 is connected, one end of the bell crank lever 13 being connected with the clutch member 10, to move the clutch member 10 out of contact with the clutch member 9, against the action of the coiled spring 14 which is shown as bearing against the clutch member 10. Mounted on the opposite end of the bell crank lever 13, is a contact member 15 which is disposed adjacent to the electromagnet 16 so that when the electromagnet 16 is energized, the contact member 15 will be attracted with the result that the clutch member 10 will be moved away from the clutch number 9 and the rotary motion of the vertical shaft 8 is temporarily stopped. The electromagnet 16 is in circuit with the contacts 17 and 18 through the wires 19, the contact 18 being in circuit with the switch member 20 that cooperates with the switch member 21 completing a circuit to the electromagnet 16. The switch member 21 is carried at one end of the pivoted arm 22 that extends to a point over the film strip being unwound, there being provided a downwardly extended finger 23 secured to the outer end of the arm 22, which finger is adapted to contact the film strip when the film strip on leaving the roll forms too large a loop. When the electromagnet operates to release the shaft 8, the winding of the film strip on the winding reel of the apparatus will cause the surplus slack in the film to be taken up. As the finger disengages the film strip, the circuit to the electromagnet is broken, and the clutch members immediately become engaged to again rotate the shaft 8.

Secured to the shaft 8 and disposed above the turn-table 6, is an inverted cone-shaped drum 24 over which the film strip roll is positioned, as clearly shown by the drawings. A plurality of centering fingers 25 are mounted on the turn-table 6, the fingers 25 being connected by means of the rods 26, so that they will move in unison, there being provided a spring member 27 which is connected with one of the fingers 25 in such a way as to normally hold the fingers in a set position on the film roll support or turn-table.

As clearly shown by Figure 7 of the drawings, the upper end of the shaft 8 is provided with an opening 28 into which the pin 29 of the guide plate 30 extends, the connection between the guide plate 30 and shaft 8 being such that the guide plate 30 may be swung upwardly out of the way, when the film strip roll is being positioned on the turn-table. Upstanding flanges 31 and 32 are formed along the longitudinal edges of the guide plate 30, the flange 31 being appreciably wider than the flange 32, to take care of the bulging of the film strip as it twists in its movement from the center of the film strip roll, onto the guide plate 30.

Arranged adjacent to the outer end of the guide plate 30, is a spring arm 33 under which the film strip which is indicated by the reference character 34, passes, the film strip also moving over the roller 35 mounted directly under the spring arm 33. This spring arm prevents the film strip from being fed too rapidly from the film strip roll.

The receiving reel onto which the film is wound, is indicated by the reference character 36, and comprises a hub 37 mounted on the shaft 38 which is rotated at the same rate of speed as the turn-table. The reel 36 also includes a plurality of outer sections 39 which are connected to the hub 37 by the links 40, the arrangement of the connection between the links 40 and outer sections 39, being such that the outer sections 39 have their inner ends disposed adjacent to the wall of the housing 5. The links 40 incline towards the housing, as shown by Figure 6 of the drawings, to the end that as the film strip is being wound thereon, the film strip will hold the outer sections of the reel against movement towards the outer end of the reel, under normal conditions, and thus hold the film strip to the reel as it is being wound thereon.

In the event that the device is used as an attachment for machines which are not equipped to gear the turn-table with the receiving reel, long fingers such as indicated by Figure 12 of the drawings, and indicated by the reference character 41 are provided, the fingers 41 being secured to the supporting disk 42 that in turn is secured to the outer end of the guide plate 30', which is identical in construction with the guide plate previously described and indicated by the reference character 30.

These fingers 41 are so spaced and arranged that they will hold the loops of the film strip roll separated at the point where the strip leaves the roll, to prevent the kinking or bending of the strip to retard the unwinding of the strip and damage to the film strip.

The supporting disk 42 is formed with an opening, so that the pin 29' which is secured to the outer end of the guide plate, will extend therethrough, the pin 29' being formed with a reduced end portion 32' that is fitted in an opening formed in the upper end of the vertical shaft 8'. In order that the film strip will move freely over the fingers 41, rollers 43 are mounted at the free ends thereof, to contact the film strip, the rollers being somewhat tilted so that they will cause the film strip to tilt in a predetermined direction as the film strip passes from the film strip roll.

It might be further stated that the power shaft is indicated by the reference character 45 and that the movement is transmitted to the reel 36 and shaft 11, through the worm gear 46 mounted on one end of the shaft 45, and gear 47 which is secured to the shaft 38.

In use, a spool roll of film strip is positioned on the turn-table 6, and the centering fingers 25 are allowed to move against the outermost convolutions of the roll. The inner end of the strip is now moved over the guide plate 30 and is threaded through the projecting machine, where it is secured to the receiving reel 36.

As the film strip passes from the inverted cone-shape drum 24, the strip tilts slightly so that only a small portion of the inverted cone-shape drum, contacts with the film, thereby reducing wear on the film strip, to a minimum.

After the entire length of the film strip has been wound on to the receiving reel 36, the receiving reel is manually collapsed by pulling the roll of film strip outwardly. As the diameter of the receiving reel is reduced, the film roll may be readily removed and replaced on the turn-table for re-exhibiting.

Due to the construction shown and described, it will be seen that the film strip may be unwound from its roll at the center or hub of the roll, eliminating the necessity of rewinding the film strip on a spool so that the pictures on the strip will be properly displayed.

Having thus described the invention, what is claimed is:

1. In a motion picture film strip unwinding apparatus, a support, a turn-table mounted on the support, pivoted concentric spring pressed centering fingers operating in horizontal planes mounted on the turn-table rods connecting adjacent centering fingers, said fingers gripping a roll of film mounted on the turntable, said fingers adapted to move inwardly as the film strip is removed from the roll and control the passage of film strip from the roll, a guide member over which the film strip moves on its passage through a moving picture projecting machine, and a reel on which the film strip is wound.

2. In a motion picture film strip unwinding apparatus, a support, a turn-table mounted on the support, pivoted concentric spring-pressed pivoted centering fingers operating in horizontal planes, mounted on the turn-table and adapted to grip the roll of film mounted on the turntable, said fingers engaging the outer-most loop of the roll of film, said fingers adapted to move inwardly as the film strip is removed from the roll and control the passage of film strip from the roll rods connecting adjacent centering fingers, a guide member over which the film strip moves on its passage through a moving picture projecting machine, and a reel on which the film strip is wound.

3. A motion picture film strip unwinding apparatus adapted to unwind film strip from the center of a roll of film strip, comprising a support, a turn-table mounted on the support on which a roll of film strip is mounted, an inverted cone-shaped drum secured on the turn-table, around which the film strip is moved, a supporting disc mounted above the drum, arms depending from the supporting disc, rollers mounted on the free ends of the arms, said rollers engaging loops of film strip being unwound from the roll and holding portions of the film strip spaced from the drum, and a guide plate over which the film strip moves on its passage from the turn-table.

EARL H. HURLEY.

REFERENCES CITED

The following references are of record in the file of this patent:

UNITED STATES PATENTS

| Number | Name | Date |
|---|---|---|
| 980,378 | Wiggins | Jan. 3, 1911 |
| 1,021,617 | Merkel et al. | Mar. 26, 1912 |
| 1,026,991 | Merkel | May 21, 1912 |
| 1,075,487 | Merkel | Oct. 14, 1913 |
| 1,144,694 | Delaney | June 29, 1915 |
| 1,968,250 | Frederick et al. | July 31, 1934 |
| 2,094,922 | John | Oct. 5, 1937 |
| 2,129,467 | Frederick | Sept. 6, 1938 |
| 2,171,991 | Rall | Sept. 5, 1939 |
| 2,332,717 | Heyer | Oct. 26, 1943 |
| 2,398,639 | Heyer | Apr. 16, 1946 |

FOREIGN PATENTS

| Number | Country | Date |
|---|---|---|
| 160,542 | Great Britain | Mar. 21, 1921 |
| 231,959 | Great Britain | Apr. 16, 1925 |
| 16,792 | France | Feb. 6, 1913 |

1st addition to 423,066